United States Patent Office 3,160,554
Patented Dec. 8, 1964

3,160,554
PROTECTING PLANTS FROM INSECTS WITH 2-DIMETHYL - AMINOPHENYL-N-METHYL-CARBAMATE
Rudolf Heiss and Ernst Böcker, Cologne-Stammheim, and Gunter Unterstenhöfer, Opladen, Germany, assignors to Farbenfabriken Bayer Aktiengesellschaft, Leverkusen, Germany, a corporation of Germany
No Drawing. Filed July 13, 1961, Ser. No. 123,624
Claims priority, application Germany July 23, 1960
3 Claims. (Cl. 167—30)

The present invention relates to and has as its objects pest control agents having an insecticidal activity and whose active constituent is 2-dimethyl-aminophenyl-N-methyl-carbamate.

This carbamic acid derivative of the following formula,

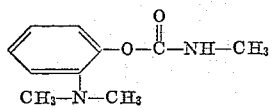

to be used according to the present invention is distinguished by an excellent activity for combating plant-damaging insects, especially aphids. In this respect the compound is superior to the carbamates hitherto known for this purpose.

The above compound may be prepared for example by utilizing the process described by Stedman in "Biochemical Journal," volume 20, on page 725.

The practical application of the compounds to be used according to the present invention is carried out in a manner known in principle, i.e. in a suitable dilution with solid or liquid extenders or diluents such as talc, chalk, bentonite, kieselguhr and the like. As liquid diluent water together with suitable solvent such as acetone, dimethyl formamide, o-dichlorobenzene and the like is chiefly suitable, an addition of emulsifiers being desirable in most cases. Polyglycol ethers of phenols have proved to be especially suitable emulsifiers.

The following example is given for the purpose of illustrating the present invention.

Example

The following table shows the activity of 2-dimethyl-aminophenyl-N-methylcarbamate against Plutella maculipennis, Drosophila and Aphis fabae. The tests with caterpillars (Plutella maculipennis) were carried out on cabbage leaves. The fly tests were carried out in closed rooms under conventional experimental conditions, and the values for aphids were determined for Vicia faba (bush beans) according to the standard evaluation procedures.

Aqueous dilutions of the compound mentioned above have been prepared by mixing the active ingredient with the same amount of dimethyl formamide as an auxiliary solvent adding thereto 20% by weight referred to active ingredient of a commercial emulsifier consisting of a benzyl hydroxy polyglycol ether containing about 10 to 15 glycol residues, and diluting at last this premixture with water to the desired concentration as indicated below.

The tests were carried out as follows:

(a) Against caterpillars of the type diamond black moth (Plutella maculipennis): White cabbage has been sprayed drip wet with aqueous emulsions as prepared above and in a concentration as shown below. Caterpillars (10 each) have been placed on the sprayed leaves of the white cabbage. The living status has been determined after 24 and 48 hours. The results are to be seen from the table below.

(b) Against flies (Drosophila): About 50 flies are placed under covered petri dishes in which drip wet filter papers have been placed which were sprayed with an insecticidal solution of a concentration as shown below. The living status of the flies has been determined after 24 hours. The results are to be seen from the table below.

(c) Against aphids (contact-insecticidal action) of the type Aphis fabae: Heavily infested bean plants (Vicia faba) have been sprayed drip wet with solutions as prepared above. The effect has been determined after 24 hours by counting the dead pests either on the surface of the soil or still remaining on the plants. The results are to be seen from the table below.

| Concentration in percent (aqueous emulsion) | Killing rate in percent | | |
|---|---|---|---|
| | Plutella maculipennis | Drosophila | Aphis fabae |
| 0.2 | 100 | 60 | 100 |
| 0.02 | 100 | | 100 |
| 0.002 | | | 40 |

We claim:
1. In a process for protecting a plant from insect damage, the improvement comprising contacting the plant with an effective amount of an active compound having the formula

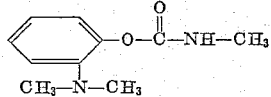

2. A process of claim 1 in which the plant is contacted at the locus of infestation with a preparation having an effective amount of the compound.

3. A process of claim 1 wherein an aqueous emulsion is employed comprising about .2% to .002% by weight of the active compound together with an auxiliary solvent and an emulsifier.

References Cited in the file of this patent
UNITED STATES PATENTS
2,843,519    Fitch _____ July 15, 1958
OTHER REFERENCES
Kolbenzen et al.: J. Agr. Food Chem., vol. 2, pages 864–870, 1954.
Stedman: Biochemical Journal, vol. 20, No. 4, pp. 719–734, 1926 (page 725 relied on).